United States Patent Office 3,554,900
Patented Jan. 12, 1971

3,554,900
SUPPRESSION OF EXTERNAL ACTIVITY OF METAL-CONTAINING ZEOLITE CATALYSTS
Emmerson Bowes, Erie, Pa., assignor to Mobil Oil Corporation, a corporation of New York
No Drawing. Filed Sept. 16, 1968, Ser. No. 760,058
Int. Cl. C10g 13/02
U.S. Cl. 208—111  18 Claims

ABSTRACT OF THE DISCLOSURE

A method of treating a zeolite containing a catalytically active metal component on its external surface to render the external surface of said zeolite lower in catalytic activity without affecting the catalytic activity of the interior of said zeolite which comprises contacting said zeolite with a solution of a compound of a metal other than that constituting said catalytically active metal component in a solvent incapable of entering the pores of said zeolite and depositing the metal of said compound on the surface of said zeolite containing said catalytically active metal component, whereby the catalytic activity of the external surface of said zeolite is diminished without effecting removal of a substantial portion of said catalytically active metal from said zeolite. Also, the zeolite prepared by the aforesaid method and catalytic hydrocarbon conversion in the presence thereof.

BACKGROUND OF THE INVENTION

Field of the invention

This invention relates to the suppression of external activity of the surface of a zeolite catalyst containing a catalytically active metal. More particularly, this invention relates to the suppression of the catalytic activity of the surface of a nickel zeolite whereby the same can be used as a catalyst for hydrocarbon conversion wherein substantially only entering molecules are converted.

Discussion of the prior art

Zeolite catalysts have been proposed for use in shape selective catalysis for the purpose of converting only those molecules which enter the zeolite pores. Normally, since the catalyst contains some external catalytically active sites, even those molecules which do not pass through the pores of the zeolite are converted to undesirable products. Thus, it has become desirable to provide shape selective zeolite catalysts having substantially no external catalytic activity, i.e., having substantially no catalytically active sites on the external surfaces of the zeolite. Several methods of performing this have heretofore been proposed. These include removing, as by ion exchange, the metal ions on the external surface of the zeolite employing a solution incapable of entering within the pores of the zeolite. Other methods have been proposed in which added metal, as in the case of a hydrogenation catalyst, is poisoned employing an organic metal compound which is incapable of entering within the pores of the zeolite and, thus, incapable of poisoning the internal catalytically active sites. Still other methods reside in dissolving off added metal, e.g., platinum, by a method which prevents metal deposited on the inner surfaces of the zeolite from passing out through the zeolite pores.

SUMMARY OF THE INVENTION

Broadly, this invention contemplates a method of treating a zeolite containing a catalytically active metal component on its external surface to render the external surface of said zeolite lower in catalytic activity without affecting the catalytic activity of the interior of said zeolite which comprises contacting said zeolite with a solution of a compound of a metal other than that constituting said catalytically active metal component in a solvent incapable of entering the pores of said zeolite and depositing the metal of said compound on the surface of said zeolite containing said catalytically active metal component, whereby the catalytic activity of the external surface of said zeolite is diminished without effecting removal of a substantial portion of said catalytically active metal from said zeolite.

DISCUSSION OF SPECIFIC EMBODIMENTS

In a particularly desirable embodiment, this invention contemplates a method of treating a zeolite containing added metal on its external surface to render the external surface of the zeolite lower in catalytic activity in accordance with the method of the invention as stated above.

Specifically, the present invention contemplates treating zeolites which have catalytically-active sites either by virtue of the cations within the framework or by virtue of deposition of a catalytically-active metal. Such catalytically-active metal is normally one capable of performing a hydrogenation-dehydrogenation function although other added metals capable of performing an oxidation or other function are contemplated. Thus, the present invention is applicable to the treatment of zeolites in their rare earth or other form as well as those zeolites to which there has been added one of these metals. Listed below is a table setting forth the specific contacting metal which is employed in solution form opposite the metal in or on the zeolite, the external activity of which it is desired to suppress.

Table 1

| Contacting metal: | Catalytically active metal component |
|---|---|
| Copper, copper salts, copper complexes | Nickel. |
| Nickel, nickel salts, nickel complexes | Copper. |
| Lead, lead salts, lead complexes | Platinium, palladium. |

It should be understood that the selection of the specific solution employed for suppressing the external activity depends upon the specific metal on the external surface of the zeolite. The reason for this is not fully understood. While not wishing to be bound by any specific theory, it is believed, for instance, by treatment of a nickel zeolite with a solution of copper or a copper salt or complex, that some type of a nickel-copper alloy is formed whereby the catalytic activity of the nickel on the surfaces of the zeolite is substantially suppressed.

The method of the present invention is applicable for the treatment of any zeolite as long as the molecules of the solvent in which the contacting metal are dissolved are large enough that they are incapable of entering within the pores of the specific zeolite being treated. A wide variety of zeolite materials, both naturally occurring and synthetic, can be treated according to this invention. These zeolites include gmelinite, chabazite, dachiardite, clinoptilolite, faujasite, heulandite, analcite, levynite, erionite, sodalite, cancrinite, nepheline, lazurite, scolecite, natrolite, offretite, mesolite, mordenite, brewsterite, ferrierite, and the like. Suitable synthetic zeolites which can be treated in accordance with this invention include zeolites X, Y, A, L, ZK-4, B, E, F, H, J, M, Q, T, W, and Z. These zeolites generally have a uniform pore size between about 4 and 15 angstrom units in diameter and have highly ordered structures. They are crystalline as revealed by X-ray analysis.

The catalysts prepared in accordance with this invention find extensive utility in a wide variety of hydrocarbon conversion processes including isomerization, dealkylation, alkylation, disproportionation, hydration of olefins, amination of olefins, hydrocarbon oxidation, dehydrogenation, dehydration of alcohols, desulfurization, hydrogenation, hydroforming, reforming, cracking, hydrocracking, oxidation, polymerization and the like.

Suitable catalytically active metal components which are initially deposited on the zeolite include one or more of the following metals of Groups I–B, II–B, III–A, IV, V, VI, VII and VIII of the Periodic Table. Representative of these metals are copper, zinc, rare earths, actinium, titanium, tin, molybdenum, chromium, tungsten, iron, vanadium, cobalt, nickel, manganese, and metals of the platinum group, i.e., platinum palladium, osmium, rhodium, ruthenium and iridium as well as combination of these metals, their salts, oxides or sulfides.

Catalytic processes contemplated by the present invention may be considered to be of two classes. In the first class are those processes in which a single reactant is ordinarily transformed to desirable products over the two-above categories of catalytic sites, but the external accessible sites also cause some reactant or product to be catalytically converted in part to undesirable by-products accessible only to such sites. This class may be illustrated by the hydrocracking of hexanes as follows:

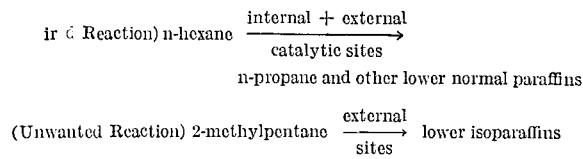

By the present method due to suppression of external sites, only the desired reaction is provided as follows:

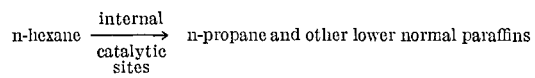

In the second class are processes in which the reactant charge is composed of at least two types of components, one of which is accessible, by reason of its size and shape, only to the external catalytic sites. This class may be illustrated by dehydrogenation of a mixture of a normal aliphatic and isoaliphatic hydrocarbons in accordance with the following equations:

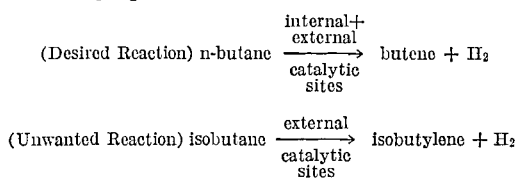

Following the teachings of this invention, a catalytic poison accessible only to the external catalytic sites serves to suppress the unwanted reaction leaving only:

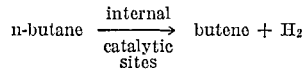

Catalytic systems in which both of the above classes of reactions play a role obviously also benefit from the improved selective catalytic conversion process of the invention.

It will be understood that the size selective catalyst component may be either utilized by itself or in combination with other solids. Thus, the size selective component may be intimately combined with and dispersed in a suitable matrix such as, for example, an inorganic oxide gel. Likewise, the internal and external catalytic sites may be located on different catalyst particles. For example, composites of molecular sieves and catalytically-active clays are contemplated for use in the present process, even though one component by itself, i.e., the clay does not exhibit internal selective catalytic sites and consequently shows no selectivity in the absence of the molecular sieve component.

The form of the metal to be added to the zeolite, i.e. as the metal itself, a salt or complex will depend upon the availability of a suitable solvent to dissolve the metal. The solvent must be incapable of entering the pores of the zeolite. Suitable solvents are: substituted formamides, sulfones and sufoxides, such as dimethylformamide, dimethylsulfone (molten), dimethylsulfoxide; alcohols, preferably branched chain alcohols having 4 to 12 carbon atoms; ethers, preferably branched, non-primary or cyclic having up to 10 carbon atoms, such as dioxane, tetrahydrofurane, diisopropyl ether; ketones such as 2-butanone; aldehydes such as i-butyraldehyde; organic esters and acids having up to 10 carbon atoms, such as propyl acetate and propionic acid; amines having sufficiently large alkyl- or cycloalkyl groups; amides; nitriles, such as acetonitrile, propionitrile, acrylonitrile; aromatics; substituted aromatics; and heterocyclic compounds such as piperidines and thiophenes. It will be readily appreciated that a wide range of non-aqueous solvents may be chosen according to their molecular size which may be found in standard reference works. The choice of a particular solvent will, of course, depend upon the pore diameter of the zeolite which is to be treated.

In accordance with the process of the invention, the deposition of added metal on the surface of the catalytically-active zeolite in such a manner that it is not deposited on the interior of the zeolite inhibits the catalytic activity of the external sites thus suppressing the undesired formation of by-products.

It will be evident from the foregoing that with the method of the invention, catalytic selectivity is achieved by establishing catalytic reaction systems in which catalytically-active surfaces are located within the internal volume of porous solids having extremely uniform pore dimensions which are in such relation to the chemical species involved in the catalytic reaction that only selected species are allowed to enter the pores of the solid structure, the external catalytic surfaces of such solid having been treated with a metal solution in such a manner that deposited metal inhibits the catalytic activity of the external sites. Since the metal is precluded from entering the pores, the method is thus incapable of substantially inhibiting the internal catalytic sites.

In order to more fully illustrate the nature of the invention and the manner of practicing the same, the following examples are presented:

EXAMPLE 1

Nickel erionite was prepared by ion exchange of a naturally-occurring erionite with a nickel-salt solution. Thereafter, it was calcined. A portion of the sample weighing .235 gram was treated with .47 cubic centimeter solution of .035 gram copper acetate in 20 cubic centimeter dimethylformamide. The solution contacted the nickel erionite for at least one hour. Thereafter, the solvent was evaporated overnight. Two cubic centimeters of dimethylformamide were thereafter added to the treated zeolite and the solvent was once again evaporated. It was then calcined at 950° F. for about 1½ hours. The catalyst contained about .1 weight percent copper.

Into a reactor was charged 0.1013 gram of the catalyst prepared above diluted with 0.5014 gram of glass particles. A 50/50 percent mixture of normal hexane and 2-methylpentane was prepared and the reactor unit was flushed with nitrogen and hydrogen and a hydrogen flow rate through the reaction vessel was established at 35 cubic centimeters per minute. The pressure was about 200 p.s.i.g. The reactor heater was turned on to raise the temperature of the closed reactor to 900° F. over a 30 minute period. It was held at 900° F. for one hour after which the temperature was lowered to 800° F. The 50/50 percent blend of normal hexane and 2-methylpentane was charged into the reactor while the same was maintained at 800° F. It was charged into the reactor by pulsing it in at the rate of 69 pulses per minute. The reactor was maintained at a temperature between 800 and 900° F. for 3½ hours after which it was cooled down. The hydrocarbon effluent was analyzed by gas chromotography. The results showed a methane to propane weight ratio of .008 and a ratio of methane plus ethane to propane of 0.54 in the first sample tested. The methane to propane ratio increased only slightly to .05 towards the end of the reaction. These ratios indicate that reaction proceed largely to form propane and no wild hydrocracking occurred to form substantial amounts of methane. Substantially, no hydrocracking of 2-methylpentane was found as revealed by only small quantities of isoparaffins such as isobutane in the reaction effluent.

Seventy percent of the normal hexane was converted to the lower molecular weight product principally as revealed by the above ratios.

EXAMPLE 2

.13 gram of the same nickel erionite employed in Example 1 were treated with .20 cubic centimeter of a solution comprising .017 gram copper acetate in 20 cubic centimeters of dimethylformamide. The solvent was evaporated off in a manner similar to that of Example 1. The resultant catalyst contained about .03 weight percent copper.

The same reactor employed in Example 1 was charged with 0.100 gram of the catalyst prepared according to this example together 0.5010 gram glass particles to form a catalyst bed. The unit was flushed with nitrogen and pressured to 200 pounds hydrogen and the flow rate of 35 cubic centimeters per minute hydrogen was established through the catalyst bed. Heat was applied to the reactor and a temperature of about 900° F. was established. The reactor was maintained at a temperature between 700° F. and 900° F. as a 50/50 weight percent blend of normal hexane and 2-methylpentane was charged through the reactor for a period of about 4 hours. Analysis of the sample after that period revealed a methane to propane ratio of .29 and a methane plus ethane to propane ratio of .45. The results showed that about 46 weight percent of the normal hexane cracked as against only 20 percent of the 2-methylpentane. This indicates that the catalyst is highly selective for the cracking of normal paraffins in a normal paraffin-isoparaffin mixture since the hydrogen reaction catalytic activity of the catalyst surface has been substantially diminished by the present method.

Hydrocarbon conversion employing a catalyst having an active catalytic metal component whose activity has not been diminished by the process of the present invention tends to produce excessive amount of methane and ethane in place of propane and the various hydrocarbon conversion runs are not reproducible in the case of a nickel erionite catalyst. The product varies between 100 percent methane and a product having a methane to propane ratio of 261 and a methane and ethane to propane ratio of 400. Typical values of these ratios are 1.1 and 1.5 respectively with a conversion of 92 percent normal hexane and 70 percent of the 2-methylpentanes. It should be noted that the catalyst which has been treated pursuant to the present invention behaves particularly well at 800° F.

EXAMPLE 3

Three grams of the nickel erionite employed in Example 1 were pre-wetted with a small amount of dimethylformamide. A copper acetate solution was made containing .0174 gram copper acetate in 25 cubic centimeters of dimethylformamide. 5.1 cubic centimeters of the copper acetate solution were added to the wetted catalyst and evaporated with heat under vacuum over about 1½ hours. The temperature ranged up to about 162° C. The catalyst was split into two equal portions, one of which was rewetted with dimethylformamide and contacted for ½ hour to ensure even distribution of the copper over the zeolite surface. It was re-evaporated at 162° C. The catalyst after drying was calcined for 1½ hours at 500° C. The weight of catalyst before calcining was 1.884 grams and after calcining was 1.807 grams. It contained about .03 weight percent copper.

EXAMPLE 4

Example 3 was repeated except that 0.96 gram of calcined nickel erionite and 2.61 cubic centimeters of the same copper acetate solution were employed. It was evaporated under vacuum at 170° C. for 20 minutes. It was re-wetted and dried as in Example 3 and subsequently re-wetted again and dried at 120–140° C. over the course of about 1¼ hour. After calcination, the catalyst contained .06 weight percent copper.

The catalysts of Example 3 and Example 4 were tested for their shape selective catalysis in the hydrocracking of a 1:2:1 mixture of isohexanes, benzene and normal hexane. The catalyst of Example 3 showed a decrease in the amount of benzene cracked over a catalyst which had not been treated pursuant to the present invention. The catalyst of Example 3 also showed a favorable methane to propane mole ratio of 2.0 indicating that the catalyst performed reasonably well for normal hexane hydrocracking to LPG products. The catalyst of Example 4 showed substantially less benzene conversion than the catalyst of Example 3 under the same reaction conditions. Specifically, it showed thta 38 percent of the isohexanes were converted, 12 percent of the benzene against 98 percent conversion for the normal hexane indicating substantial shape selective catalysis. In both of these conversions, the temperature was 900° F. and the pressure was 200 p.s.i.g. The catalyst of Example 4 was tested at 700° F. and 200 p.s.i.g. to determine the amount of benzene hydrogenated. 33.8 percent by weight of the benzene was hydrogenated against about 60 weight percent for catalysts untreated.

From the foregoing, it is apparent that the method of the present invention substantially inhibits catalytic activity of the external surface of catalytically-active zeolites and, thus, enables shape selective catalysis without substantial conversion of the hydrocarbon excluded from the zeolite. Catalysts treated pursuant to the present invention need not be retreated after catalyst regeneration whereas catalysts treated pursuant to the methods of the prior art must be retreated after catalyst regeneration to suppress the catalytic activity of the external sites.

Catalysts treated in accordance with the present invention can be used in any of the foregoing hydrocarbon conversion reactions employing the usual process parameters as no specific change in these reaction conditions is necessitated by reason of the catalyst treatment. For instance, hydrocracking of a distillate oil, a heavy petroleum residual stock or a cycle stock employing a hydrocracking catalyst treated in accordance with the present invention can be performed at temperatures between 400° F. and 825° F. with a mole ratio of hydrogen to hydrocarbon charged in the range 2 and 80. The pressure employed will vary between 10 and 2000 p.s.i.g. and the liquid hourly space velocity between 0.1 and 10.

The terms and expressions as used herein have been used as terms of illustration and not of limitation, as there is no intention, in the use of such terms and expressions, of excluding any equivalent or portions thereof, as many modifications and departures are contemplated within the scope of the appended claims.

What is claimed is:

1. A method of treating a zeolite containing a catalytically-active metal component on its external surface to render the external surface of said zeolite lower in catalytic activity without affecting the catalytic activity of the interior of said zeolite which comprises adding to said zeolite a poisoning metal by contacting said zeolite with a solution of a compound of said poisoning metal which is one other than said metal constituting said catalytically-active metal component in a solvent incapable of entering the pores of said zeolite, removing said solvent whereby said metal is deposited on the surface of said zeolite containing said catalytically-active metal component and the catalytic activity on the external surface of said zeolite is diminished upon heating the resultant so treated catalyst in a reducing environment without effecting removal of a substantial portion of said catalytically-active metal from said zeolite, the metal in solution being capable of combining with the metal component on the external surface of the zeolite to inhibit its normal catalytic activity.

2. A method according to claim 1 wherein said catalytically-active component is metal which has been added to the zeolite by deposition.

3. A method according to claim 1 wherein said catalytically-active metal component is part of the framework of said zeolite.

4. A method according to claim 2 wherein said catalytically-active metal component is nickel and it is treated with a solution of a copper compound.

5. A method according to claim 2 wherein said catalytically-active metal component is copper and said zeolite is treated with a solution of a nickel compound.

6. A method according to claim 2 wherein said catalytically-active metal component is platinum and said zeolite is treated with a solution of a lead compound.

7. A method according to claim 2 wherein said catalytically-active metal component is palladium and said zeolite is treated with a solution of a lead compound.

8. A method according to claim 4 wherein copper acetate is employed in a solution.

9. A method according to claim 1 wherein the solvent of said solution is dimethylformamide.

10. A shape-selective zeolite catalyst prepared by the method of claim 1.

11. A shape-selective zeolite catalyst prepared by the method of claim 4.

12. A shape-selective zeolite catalyst prepared by the method of claim 5.

13. A shape-selective zeolite catalyst prepared by the method of claim 6.

14. A shape-selective zeolite catalyst prepared by the method of claim 7.

15. A shape-selective zeolite catalyst prepared by the method of claim 8.

16. A method of selectively converting a mixture of hydrocarbons comprising contacting said mixture with the catalyst of claim 10, said mixture comprising at least one component capable of entering within the pores of said zeolite and at least one component which due to its size is excluded from the pores of said zeolite.

17. A method of hydrocracking a hydrocracking stock which comprises contacting said stock at a temperature between 400 and 825° F. in the presence of hydrogen present such that the hydrogen to hydrocarbon mole ratio is between 2 and 80, at a pressure between 10 and 2000 p.s.i.g. and at a liquid hourly space velocity between 0.1 and 10 with the catalyst of claim 10.

18. A method of hydrocracking a hydrocracking stock which comprises contacting said stock at a temperature between 400 and 825° F. in the presence of hydrogen present such that the hydrogen to hydrocarbon mole ratio is between 2 and 80, at a pressure between 10 and 2000 p.s.i.g. and at a liquid hourly space velocity between 0.1 and 10 with the catalyst of claim 12.

References Cited
UNITED STATES PATENTS 3,437,587   4/1969   Ellert et al. _____ 208—120

DELBERT E. GANTZ, Primary Examiner

A. RIMENS, Assistant Examiner

U.S. Cl. X.R.

208—120; 252—455